Figure 2A:
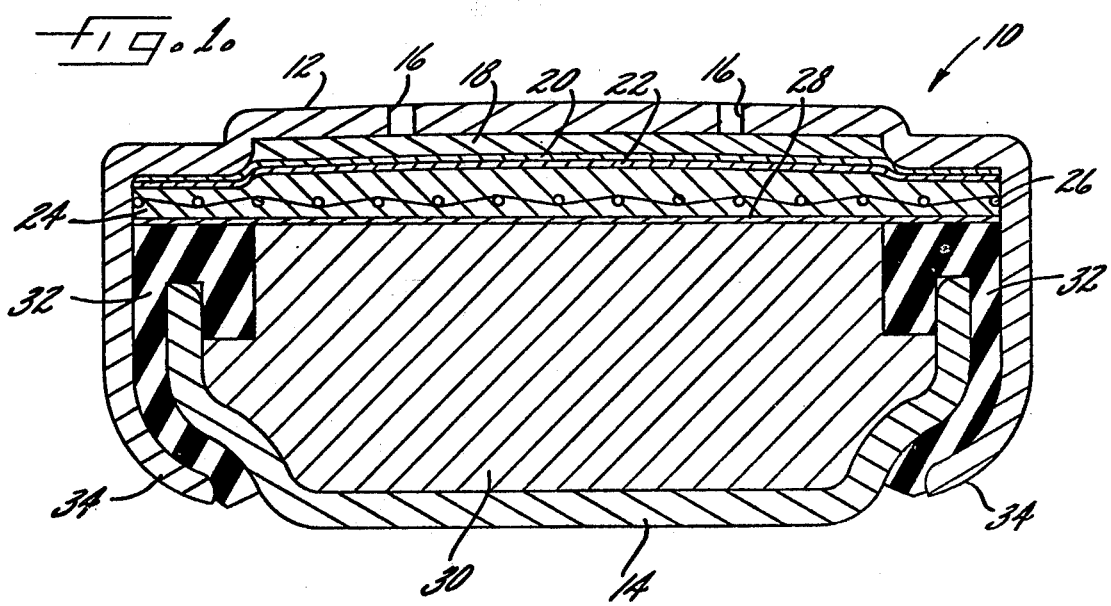

United States Patent [19]

Cretzmeyer et al.

[11] 4,189,526
[45] Feb. 19, 1980

[54] METAL/OXYGEN CELLS AND METHOD FOR OPTIMIZING THE ACTIVE LIFE PROPERTIES THEREOF

[75] Inventors: John W. Cretzmeyer, Richfield, Minn.; Hans R. Espig, Barrington, Ill.

[73] Assignee: Gould Inc., Rolling Meadows, Ill.

[21] Appl. No.: 902,151

[22] Filed: May 5, 1978

[51] Int. Cl.² ............................................ H01M 12/06
[52] U.S. Cl. .......................................... 429/13; 429/27
[58] Field of Search ....................... 429/27, 34, 35, 13, 429/162, 172

[56] References Cited

U.S. PATENT DOCUMENTS

| 3,840,404 | 10/1974 | Porter et al. | 429/27 |
| 3,897,265 | 7/1975 | Jaggard | 429/35 |
| 4,054,726 | 10/1977 | Sauer et al. | 429/27 X |

*Primary Examiner*—Anthony Skapars
*Attorney, Agent, or Firm*—Leydig, Voit, Osann, Mayer & Holt, Ltd.

[57] ABSTRACT

Metal/oxygen cells such as zinc/air cells are provided with optimum active life characteristics by interposing, on the air side of the cell, an oxygen diffusivity-limiting membrane, such as, for example, sintered polytetrafluoroethylene, so that no more oxygen is received than is needed for the current rate required for the intended application.

12 Claims, 2 Drawing Figures

CELL WITH 2 MIL SINTED P.T.F.E.

METAL/OXYGEN CELLS AND METHOD FOR OPTIMIZING THE ACTIVE LIFE PROPERTIES THEREOF

This invention relates to gas depolarized electrochemical cells and, more particularly, to metal/oxygen cells characterized by optimum active life properties.

The usage of button cells is rising in a variety of applications such as hearing aids, transistor radios, watches such as liquid crystal display types and miniature electronic calculators. Achieving optimum active life characteristics requires matching as closely as possible the maximum ingress of oxygen into the cell with the maximum discharge rate required by the particular application.

Typically, metal/oxygen cells include an outer case having an aperture or apertures and a cathode having between its surface and the aperture a porous, hydrophobic member made from a synthetic plastic such as polytetrafluoroethylene. This hydrophobic member allows the oxygen or air to permeate therethrough to the cathode but prevents the passage of electrolyte. The maximum rate of the current drain is, in general, determined by the size and the number of apertures which are utilized.

In larger cells, many solutions are known which can further restrict the current drain rate for a given aperture size. U.S. Pat. No. 3,840,404 thus suggests limiting the diffusivity of the hydrophobic layer by either pressing or by varying the thickness thereof. These solutions are suitable for applications which require current drains in the milliamp per square centimeter of cathode area range.

Likewise, it is known from German Pat. No. 2,011,232, published Oct. 1, 1970, to add to a metal/oxygen cell a layer or coating of material permitting the passage of water vapor to a lesser extent than the hydrophobic layer. This additional layer is positioned on the air side of the cell. A layer of a calendered, unplastified microporous polyvinylchloride is suggested. Other examples set forth include porous filter paper, porous nickel foil, inorganic particles and a binder such as a titanium dioxide-filled coating, a sintered, ceramic sheet or porous felts of either an organic or inorganic nature.

While, broadly speaking, some of the materials within the very general listing in the above-identified German patent may restrict oxygen diffusivity as well as that of water vapor, there is no suggestion whatever that this is either essential or even desirable. Moreover, two materials each of which have similar and low water vapor diffusivities may well have oxygen diffusivity characteristics which vary by as much as two orders of magnitude. For this reason, the selection of a material with satisfactorily low water vapor diffusivity levels will bear no relationship to whether or not oxygen diffusivity into the cell would also be limited.

Where extremely low current drain or discharge characteristics are required, viz.—lower than about 800 microamps, the optimization of the active life cannot readily be accomplished merely by reducing the size of the aperture or apertures used for controlling the current drain. As the size of the aperture becomes smaller, a point is reached below which it is generally economically undesirable to make apertures in the button cell casings. Thus, it becomes undesirable to manufacture cells when the size of the apertures required are less than about 5 to 7 mils in diameter or so. Moreover, and importantly, such small apertures are subject to blocking or the like due to dust particles or other contamination.

In addition, a significant problem in the commercial manufacture of button cells is generally the prevention of electrolyte leakage from the cell. A solution which would complicate the necessary sealing to prevent leakage would thus be undesirable.

It is accordingly a primary object of the present invention to provide a gas depolarized electrochemical cell which is characterized by improved active life characteristics. A related and more specific object is to provide a metal/oxygen button cell which matches the ingress of oxygen into the cathode with the maximum current drain rate on the microamp scale required for the intended application.

A further object provides a button cell which achieves optimum life characteristics and which does not complicate the sealing of the cell against electrolyte leakage. A related and more specific object provides the inclusion of means to limit oxygen diffusivity that is compatible with present manufacturing techniques.

Figure 2B:
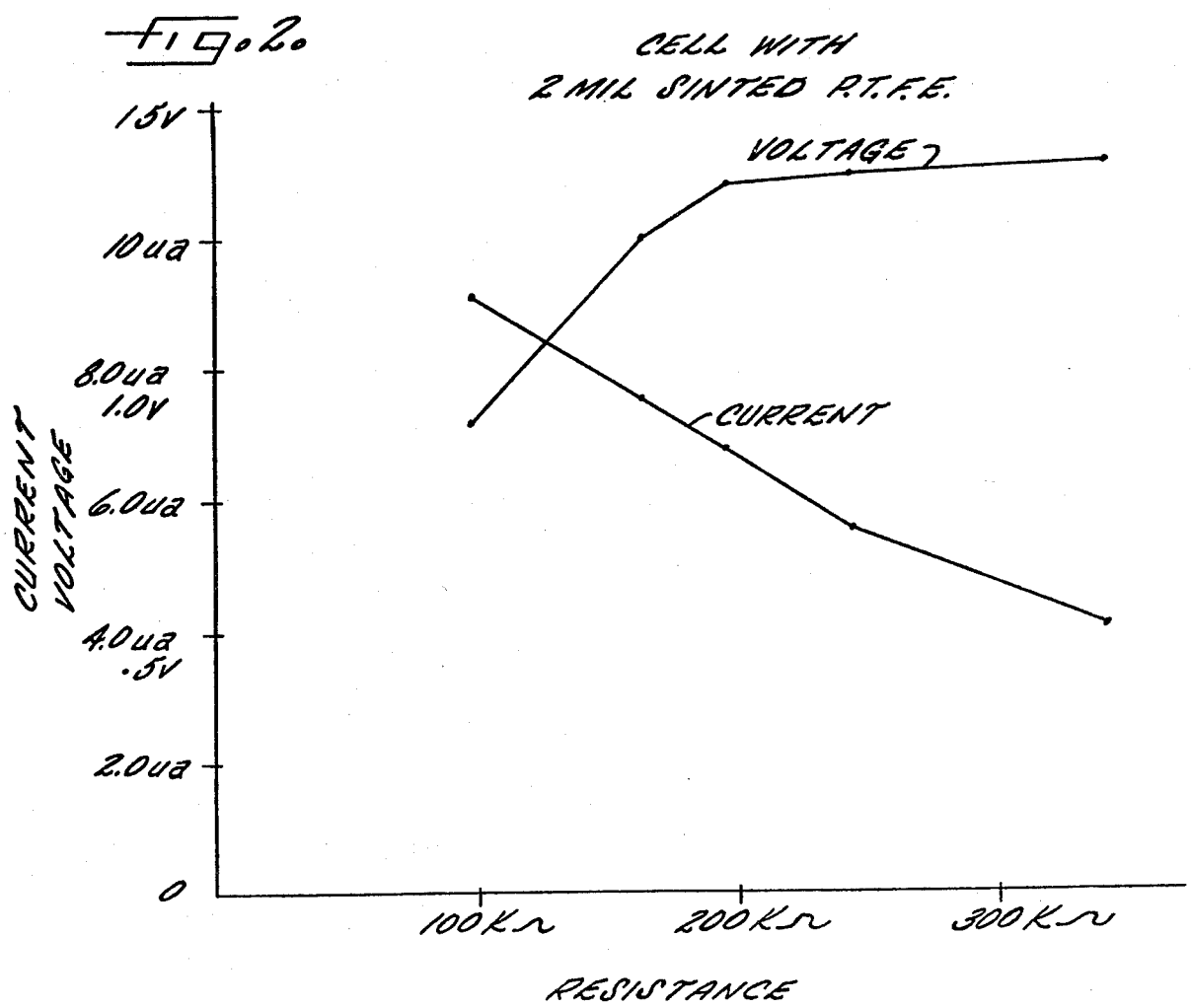

Other objects and advantages of the present invention will become apparent from the following description and from the drawings in which:

FIG. 1 is a cross-sectional view of a metal/oxygen cell in accordance with the present invention and showing the barrier means positioned within the cell to limit oxygen diffusivity, and FIG. 2 is a graph of current and voltage vs. resistance and illustrating one example of cell characteristics capable of being achieved with the present invention.

While the invention is susceptible to various modifications and alternative forms, there is shown in the drawing and will herein be described in detail, the preferred embodiments. It is to be understood, however, that it is not intended to limit the invention to the specific forms disclosed. On the contrary, it is intended to cover all modifications and alternative forms falling within the spirit and scope of the invention as expressed in the appended claims. For example, while the present invention will be described in connection with zinc/air cells, it should be appreciated that the invention is equally applicable to other metal/oxygen cells.

In general, the present invention is predicated on the discovery that the air apertures in a button cell may be left sufficiently large so as to present no manufacturing problem, yet a cell may be provided which is characterized by optimum active life. This is achieved by interposing on the air side an oxygen diffusivity-limiting membrane across the face of the cathode so that no more oxygen is received than is needed for the current rate required for the intended application.

Turning now to FIG. 1, there is shown a cross-sectional view of a metal/oxygen cell designated by reference numeral 10. The exterior casing comprises a cathode cup or casing 12 and an anode cup 14. The size and number of apertures 16 can be varied as desired; however, the amount of oxygen which is allowed to diffuse into the cell can be much greater than is desired or necessary for the current drain rate involved for the particular application. For the button cell applications relating to usage where drain rates of about 800 microamps or lower are involved, the size and number of the apertures used in accordance with the present invention becomes immaterial. However, from the practical standpoint, it has been found desirable to employ aperture sizes on the order of about 15 mils in diameter.

A porous absorbent layer 18 such as filter paper is positioned adjacent the interior of the cathode cup 12 so as to be in contact with the incoming air through apertures 16. Utilization of the absorbent, porous layer prevents incoming air from channeling and aids in promoting even air distribution over the entire surface of the cathode. A further advantage is that the layer serves in effect, as a blotter to absorb any electrolyte which might reach this portion of the cell due to some defect or another. Still, further, and importantly, the porous layer spaces the cathode from the cathode cup. While a porous absorbent layer such as filter paper has been found desirable, any other means can be used so long as the functional benefits described herein are achieved.

In accordance with the present invention, there is interposed a membrane layer 20 which limits the air diffusivity passing therethrough to the extent required to match that necessary for the current drain rate needed for the particular end use application. A variety of materials may be utilized for this purpose and will be discussed hereinafter.

Adjacent the air limiting membrane is the cathode. Any of a variety of cathode assemblies may be utilized. As illustrated in FIG. 1, the cathode assembly comprises a thin hydrophobic layer 22 which may be formed of a polymer such as unsintered polytetrafluoroethylene. Other hydrophobic materials are also suitable for use with this type of metal/oxygen cell and are known in the art. The cathode 24 includes a current collecting screen 26 positioned therein with the cathode material typically containing carbon black, a catalyst and a hydrophobic binder dispersed throughout. Suitable catalysts and other useful cathode compositions are well known in the art.

Separating the cathode from the anode is separator 28. A wide variety of suitable materials are well known and include, for example, cellulose, polypropylene, nylons and the like.

The anode material 30 is positioned on the other side of the separator from the cathode and preferably comprises zinc or amalgamated zinc powder. Typically, the electrolyte which is needed is placed on the anode material just prior to final assembly. Suitable electrolytes are well known, with potassium or sodium hydroxides being preferred.

Sealing is provided by the interposition of an insulator or seal 32. Any nonconducting materials which are inert to the electrolyte employed are suitable. Pliable polymers such as high density polyethylene, polypropylene or nylon are satisfactory. The material utilized should preferably exhibit very little tendency to cold flow.

To assemble the cell, the cathode casing is placed over the insulator-anode case-anode mix subassembly. After this has been accomplished, completion of assembly may then be accomplished by the use of a sizing die to crimp the portion of the cathode housing, as is shown generally at 34, so as to provide the necessary seal. The general assembly technique is shown in U.S. Pat. No. 3,897,265 to Jaggard.

In accordance with the present invention, as has been previously described, an oxygen diffusivity-limiting membrane is positioned on the air side of the cell, viz—adjacent the hydrophobic layer of the cathode. This allows the apertures of the cathode casing to be larger than necessary to support the low current drain rates needed for the particular end use application, yet provide for optimum active life characteristics. To this end, the membrane is selected so as to provide oxygen diffusivity characteristics which allow no more oxygen to reach the cathode surface than is required for the current drain rates needed for the particular application. The oxygen diffusivity characteristics for the material will generally be determined by parameters such as the size of the micropores, the percent porosity of the membrane and its thickness.

The desirability for limiting the oxygen reaching the cathode to that required to sustain the particular drain rate is, of course, predicated on the fact that excess oxygen may well cause self-discharge of the cell due to oxidation of the zinc anode. This will shorten the active life of the cell.

Accordingly, to obtain the optimum benefits of the present invention, it is in fact preferred to limit the oxygen reaching the cathode to essentially that level needed for the drain rate involved. It is, of course, within the scope of the present invention to utilize any oxygen diffusivity-limiting means in these low drain rate cells which limits oxygen ingress sufficiently so as to increase the active life of the cell to some degree over that which would be obtained without the means.

Virtually any type of film may be utilized which possesses the desired oxygen diffusivity characteristics in available thicknesses. As illustrative examples of suitable plastic materials, it has been found satisfactory to utilize polyethylene in film thicknesses of no greater than 0.4 mil. Unsintered polytetrafluoroethylene membranes filled with carbon and sintered polytetrafluoroethylene films are likewise acceptable. While incompatible with the alkaline electrolytes typically used in metal/oxygen cells, cellulose acetate butyrate may also be utilized. However, in such instances, the edge of the air cathode should be sealed to ensure that the electrolyte will not "wick" to the outside of the cathode-separator composite, creating a path for leakage.

The suitability of any material for a particular application can be determined by calculating the level of oxygen diffusion needed to sustain the desired discharge rate. This is readily calculated from the oxygen diffusivity characteristics for the particular material and thickness under consideration. While oxygen diffusivity can be determined by known procedures, this characteristic is available for a wide variety of materials in texts and other publications.

The thickness of the oxygen-limiting membrane can be varied as desired. In the embodiment illustrated, membranes having thicknesses of 0.5 mils or significantly less up to 6 mils or more can be tolerated. The sizing of the other internal cell components can likewise be altered to allow for thicknesses significantly in excess of 6 mils. Similarly, if desired, more than one layer of the same or even a different material may be employed to provide the desired oxygen diffusivity characteristics.

It will be generally desirable to utilize a membrane that has low water vapor diffusivity to minimize evaporation of water from the electrolyte as well as the essential oxygen diffusivity characteristics. However, in the low rate applications to which the present invention is directed, loss of considerable amounts of water can be tolerated and control of water vapor transfer is therefore less important.

As one illustrative example, for applications involving discharge rates of from about 1 to 35 microamps/square centimeter of cathode area, it has been found desirable to utilize sintered polytetrafluoroethylene. A thickness of about 2 mils for the sintered polytetrafluoroethylene is satisfactory.

The following Example is illustrative, but not in limitation of the present invention.

EXAMPLE

Ten zinc/air button cells having the configuration shown in FIG. 1, except having only a single 15 mil aperture (centered in the cathode housing) and utilizing a sintered polytetrafluoroethylene oxygen-limiting membrane of 2 mils in thickness, were constructed to illustrate the present invention.

The cells were each discharged through 200,000 ohms over a period of about 40 days. The voltages and currents were determined at periodic intervals throughout the test period.

Table 1 below sets forth the average voltage at the intervals tested for the ten test cells as well as the average current in microamps as determined by dividing the average voltage by the resistance:

| Day | Average Voltage, volts | Average Current, microamps |
|---|---|---|
| 1 | 1.395 | 6.978 |
| 2 | 1.385 | 6.92 |
| 5 | 1.390 | 6.95 |
| 12 | 1.368 | 6.84 |
| 14 | 1.376 | 6.88 |
| 26 | 1.372 | 6.86 |
| 40 | 1.392 | 6.96 |

As can be seen, the data show a satisfactorily constant voltage performance and current drain during the test period.

One test cell, utilizing the two mil thick sintered polytetrafluoroethylene membrane in accordance with the present invention, was utilized to determine the voltage-current characteristics thereof. FIG. 2 sets forth a graph of the voltage and current versus resistance over the range examined. As is shown in FIG. 2, an application requiring operation at a minimum voltage of 1.2 volts and a current drain rate of about 7 microamps can readily be provided by the test cell. Indeed, from FIG. 2, the test cell provides over 1.3 volts at a current drain rate of about 7 microamps. This operational level is of the range currently required for liquid crystal display watches.

The effect of utilization of the present invention can be perhaps best appreciated by comparing the current drain rate with that which would be involved if the oxygen diffusivity-limiting membrane of the present invention was eliminated. In this event, the current drain rate that could be obtained with the amount of oxygen entering the cell would be on the order of 4 milliamps. The difference in drain rate is thus a factor of well over 500. The air entering the cell which is in excess of that required to achieve the required voltage and current drain rates could well, of course, result in oxidation of the anode material and, thus, self-discharge of the cell.

Thus, as has been shown, the present invention provides a means of optimizing the active life of small metal/air button cells without unduly increasing the complexity or cost of assembly of such cells.

We claim:

1. A gas depolarized electrochemical cell comprising a cell casting having means allowing oxygen ingress therein at a level capable of sustaining a current in excess of 800 microamps, an anode and a cathode disposed in the casing, a separator interposed between said anode and cathode, an electrolyte positioned on the anode side of the separator, an oxygen distribution means providing oxygen across at least the majority of the cathode area, and an oxygen diffusivity-limiting membrane positioned between said cathode and said oxygen distribution means, said membrane limiting oxygen ingress to the cathode to less than the level required to sustain a current of 800 microamps.

2. The cell of claim 1 wherein said oxygen diffusivity-limiting membrane provides oxygen ingress at a rate sufficient to sustain a current drain rate of about 1 to about 35 microamps/cm$^2$ of cathode area.

3. The cell of claim 1 wherein said oxygen diffusivity-limiting membrane is a member selected from the group consisting of polyethylene, sintered polytetrafluoroethylene, unsintered polytetrafluoroethylene filled with carbon and cellulose acetate butyrate.

4. The cell of claim 3 wherein said oxygen diffusivity-limiting membrane is sintered polytetrafluoroethylene.

5. The cell of claim 1 wherein said oxygen diffusivity-limiting membrane has a thickness of from about 0.5 to about 6 mils.

6. The cell of claim 1 wherein said oxygen distribution means comprises a porous absorbent layer.

7. The cell of claim 6 wherein said porous absorbent layer is filter paper.

8. The cell of claim 1 wherein said cathode includes on the air side a hydrophobic film.

9. The cell of claim 8 wherein said hydrophobic film is unsintered polytetrafluoroethylene.

10. The cell of claim 1 wherein the anode is zinc.

11. The cell of claim 1 for use in an application requiring a particular current drain rate wherein said membrane limits oxygen ingress to the cathode to substantially that level required to sustain said particular current drain rate.

12. A method of limiting oxygen ingress to the cathode of a gas depolarized electrochemical cell so as to optimize its active life, the cell including a cell casing having means allowing oxygen ingress therein at a level capable of sustaining a current in excess of 800 microamps, an anode and a cathode disposed in the casing, a separator interposed between said anode and cathode, an electrolyte positioned on the anode side of the separator, an oxygen distribution means providing oxygen across at least the majority of the cathode area, which method comprises positioning an oxygen diffusivity-limiting membrane between said cathode and said oxygen distribution means, said membrane limiting oxygen ingress to the cathode to less than the level required to sustain a current of 800 microamps.

* * * * *